No. 667,364. Patented Feb. 5, 1901.
F. GRAFF.
BREAD OR SAUSAGE CUTTER.
(Application filed Nov. 13, 1900.)
(No Model.) 2 Sheets—Sheet 1.

Witnesses.
Otto König
J. A. Ritterhaus

Inventor.
Friedrich Graff

No. 667,364. Patented Feb. 5, 1901.
F. GRAFF.
BREAD OR SAUSAGE CUTTER.
(Application filed Nov. 13, 1900.)
(No Model.) 2 Sheets—Sheet 2.
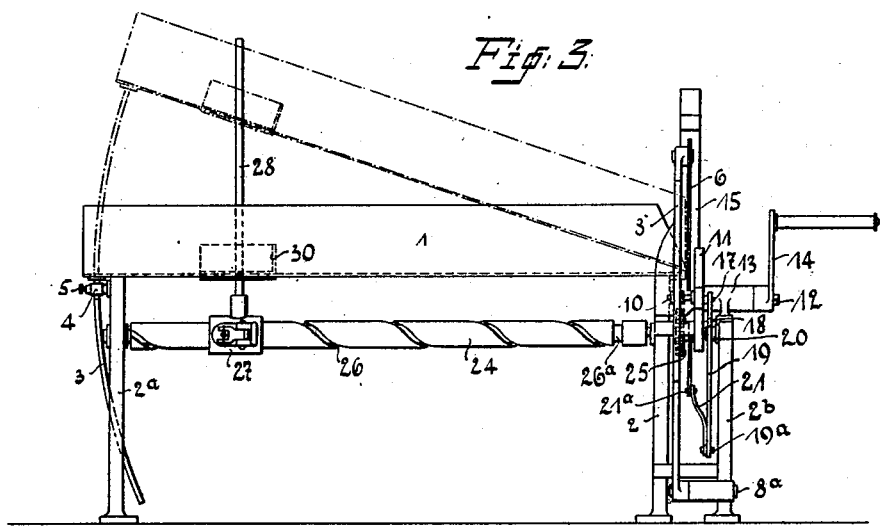
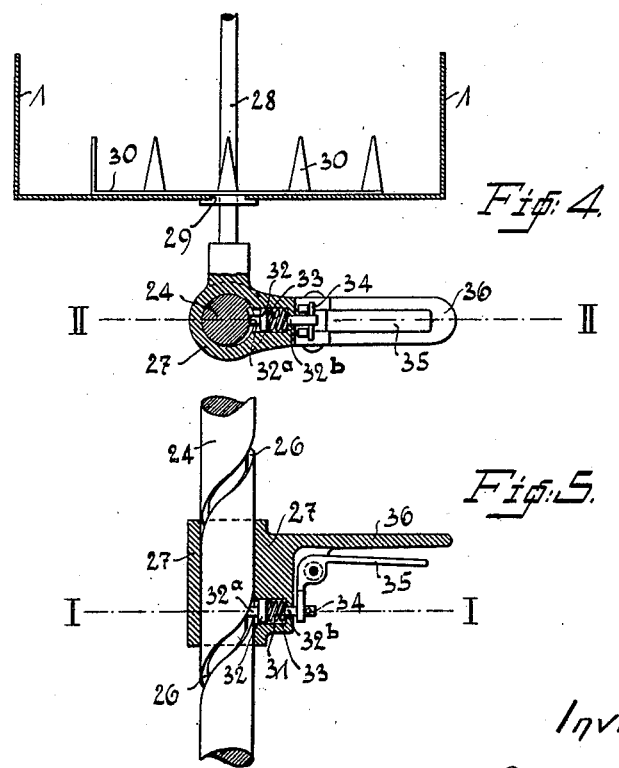
Witnesses, Inventor,

UNITED STATES PATENT OFFICE.

FRIEDRICH GRAFF, OF WITTEN, GERMANY.

BREAD OR SAUSAGE CUTTER.

SPECIFICATION forming part of Letters Patent No. 667,364, dated February 5, 1901.

Application filed November 13, 1900. Serial No. 36,384. (No model.)

*To all whom it may concern:*

Be it known that I, FRIEDRICH GRAFF, a citizen of the German Empire, residing at Witten, in the Province of Westphalia, Kingdom of Prussia, Germany, have invented certain new and useful Improvements in Bread or Sausage Cutters; and I do hereby declare the following to be a full, clear, and exact description of the invention, such as will enable others skilled in the art to which it appertains to make and use the same.

My invention relates to improvements in machines for cutting and dividing into small pieces of equal size bread, biscuit, sausages, and such like victuals; and it has for its object to do the cutting-work in the most convenient, accurate, and neat manner by a slow advance in an oblique direction of the cutting-knife, while its backward motion is done quickly, whereas at the same time the advance of the loaf of bread or of the sausage or other article to be cut in small slices can be adjusted at will for thicker or thinner slices, and when the feeding device has arrived at the end—that is to say, when the whole length of the loaf or of the sausage has been cut—the advancing of this feeding device is stopped automatically, though the machine may accidentally be kept in motion, and then this feeding device can be pushed backward into its original or starting position or any intermediate position quickly by hand. I attain these objects by the machine described hereinafter and shown on the annexed drawings, in which—

Figure 1:
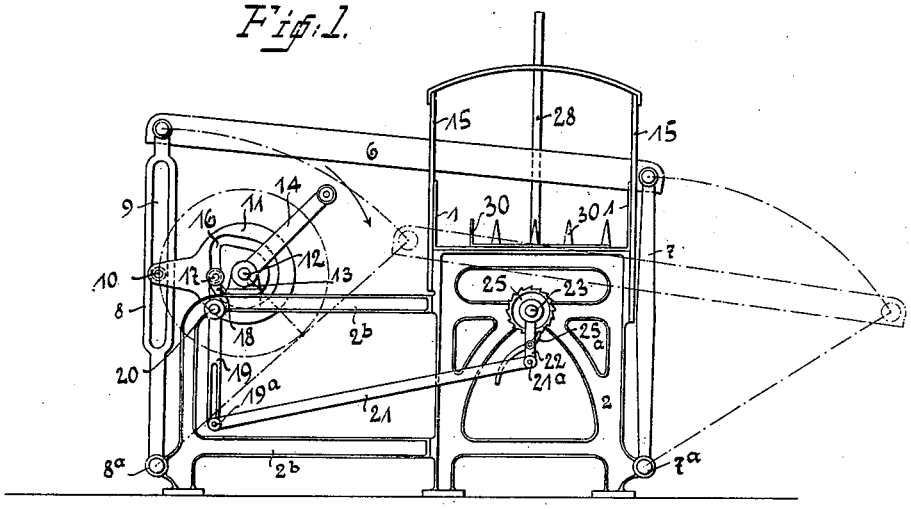
Figure 2:
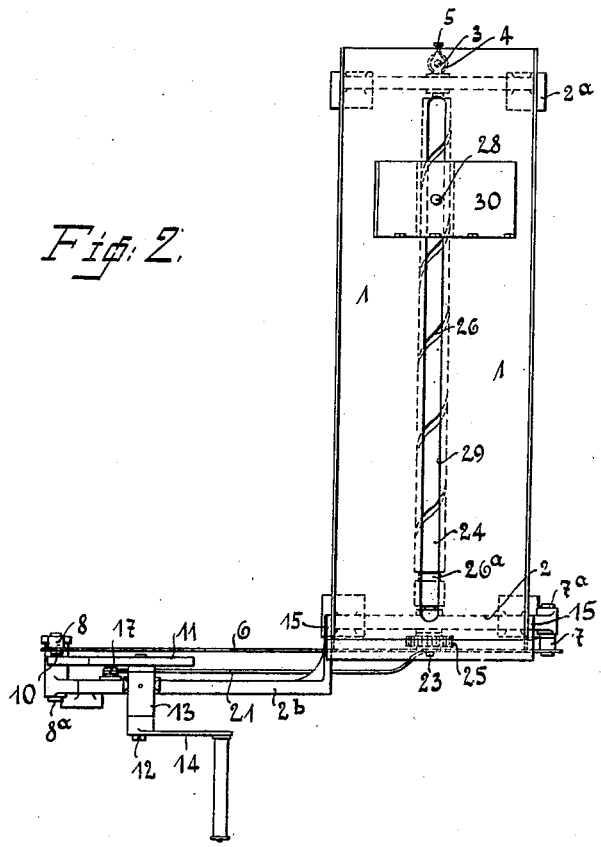

Figure 1 shows a vertical view of the machine seen from the front end. Fig. 2 is a plan of Fig. 1. Fig. 3 is a vertical side view. Fig. 4 is a cross-section of part of the feeding device along line I I of Fig. 5. Fig. 5 is a longitudinal section of this device along line II II of Fig. 4.

The article to be cut in slices is put into the table 1, resting movably with its front end upon the frame 2 of the machine and supported at its rear end by a curved bar 3, which is guided by a boss 4, fixed at the small rear frame $2^a$. A set-screw 5 serves for fixing the bar 3 at any desired height. By this means the box or table 1 can be set to any angle in vertical direction and with regard to the knife 6 going up and down vertically.

The knife 6 is linked at both its ends to rods 7 and 8, both of which are connected at their lower ends to the front frame 2 and its prolongation $2^b$ by bolts $7^a$ and $8^a$, so that they can oscillate upon these bolts. The rod 8 is provided with a slot 9, which engages with the crank-pin 10 of the crank-disk 11 of a short shaft 12, guided in the boss-bracket 13, and provided at its front end with the crank 14 for turning the crank-disk 11. The rod 7 is shorter than the rod 8, so that the knife 6 stands obliquely or slantingly from beginning to end in all its positions during the cutting action, and therefore the beginning of the cutting will be at a correspondingly-small width only, and consequently easy and requiring comparatively little pressure. It will also be understood that the advancing or cutting movement of the knife is a slow one, while its return motion is carried out quickly. The knife is guided in slots of the vertical guide-bars 15, fixed at the sides in front of the machine-frame 2.

The feeding or advancing of the article to be cut is done in the following manner and by the following means: In the face of the crank-disk 11 is cut a heart-shaped groove 16. Into this groove fits the end of a pin 17 at the end of the upper arm 18 of a two-armed lever 18 19, held movably upon a bolt 20 at the inside of the frame $2^b$. To the lower slotted end of the lever 19 is linked a connecting-rod 21, the other end of which is connected to a pin $21^a$ of an arm 22, stuck movably upon the reduced end 23 of a shaft 24, carried in bearings of the frames 2 and $2^a$ of the machine. A ratchet-wheel 25 is also fixed upon this shaft 24, and a pawl $25^a$ on the arm 22 engages said ratchet-wheel, so that it will be turned periodically with each oscillation of the arms and rod 19 21 22. The arm 19 is slotted at its lower end, so that the connecting-bolt $19^a$, jointing said arm to the rod 21, can be shifted closer to or farther away from the fulcrum of the arm 19, thereby causing the ratchet-wheel 25 to be turned more or less at each stroke of the arm 19. The shaft 24 is provided with a steep screw-thread 26, ending in a circular groove $26^a$ of same depth. Upon the shaft is guided movably a boss 27, and to this boss is fixed a vertical rod 28, passing through a longitudinal slot 29 in the table 1 and through the feed-slide 30, which is guided thereby and moved upon the table 1, the rod 28 at the same time preventing the turning of the boss 27 upon the shaft 24. The boss is also provided with a cavity 31, and into this cavity is placed a piston 32, the inner reduced end of which $32^a$ fits into the screw-thread 26. The outer reduced part $32^b$ is surrounded by a spiral spring 33, which presses the piston against the shaft 24 and its inner end into the screw-thread 26. Outside of the cavity a cross-pin 34 is passed through the part $32^b$, and the forked end of a bell-crank lever 35 reaches below the pin 34, so that by grasping the arm 36 of the boss 27, together with the adjacent and corresponding arm of the bell-crank lever, by hand the piston, with its inner end $32^a$, can be withdrawn out of its engagement with the screw-thread of the shaft 24, and then the boss 27 can be shifted backward or forward at will and quickly upon the shaft 24, thus allowing a quick setting of the feed-slide 30 at any part of the table 1 independent of the turning of the shaft 24.

The working of the machine described is as follows: The sausage or the loaf of bread is put upon the table 1, and this is brought in its proper slanting position. The feed-slide 30 is then pushed close against it, so that the front end of the loaf bears against the knife 6, which for the moment is supposed to be in its lowered position. In then turning the crank 14 and the crank-disk 11 in the direction of the arrow the knife is raised, and during a certain part of this movement the shaft 24 is turned and the feed-disk is pushed forward and with it the loaf. This then rests still while the crank is turned further, thereby drawing down the knife and pulling it at the same time toward the left, thus causing its combined drawing and cutting action and cutting off the first slice. Turning then further, the same play is repeated, and so on. During each revolution of the crank and crank-disk the knife is raised and the feed-slide is advanced a certain distance, pushing the loaf forward, then leaving this at rest during the time the knife is going down and cutting off a slice of the thickness corresponding to the amount of the advance of the feed-slide. When the feed-slide has arrived at the end of its stroke, the pin $32^a$ has reached the circular groove $26^a$, and it therefore does not push any farther the feed-slide, though the shaft 24 may be turned farther on. Now the pin $32^a$ is released from the screw-thread in the shaft 24, and the feed-slide is pushed back to its starting position, where a new loaf or a new piece of meat, &c., can be put in for being cut in slices, as before.

I am aware that meat and bread cutting machines advancing the piece of meat and cutting off automatically small slices have been in use formerly, and I do not claim, broadly, such a machine as my invention; but I am not aware that a machine has become known working like my improved machine and combining all the advantages of this machine; and What I therefore claim, and desire to secure by Letters Patent, is—

1. In a machine for cutting bread, sausages and like materials into thin slices the combination of a table 1 resting at its front end upon a frame 2, with a bent rod 3 at its rear end, a boss 4 fixed at the rear frame $2^a$ and guiding said rod 3 so that the table can be placed at any angle in vertical direction, a set-screw 5 for fixing said rod 3 and the table 1 in any desired height, a slot 29 in the bottom of said table, a feed-slide 30 capable of being shifted backward and forward upon the table, the whole as described and illustrated and for the purpose set forth.

2. In a machine for cutting bread, sausages and like materials into thin slices the combination of a table 1, a bent rod 3 at its rear end, a boss 4 at the rear frame $2^a$, a set-screw 5 screwed into said boss, a feed-slide 3 upon said table, with a screw-threaded shaft 24 carried in bearings of the frames 2 and $2^a$, a boss 27 stuck movably upon said shaft, a rod 28 fixed to said boss and reaching up through the slot 29 into and through the bottom of the feed-slide 30, a cavity 31 in said boss 27, a piston 32 placed therein, a spiral spring 33 pressing the reduced end $32^a$ of said piston down into the screw-thread 26 of shaft 24, the reduced upper end of the piston projecting out of the boss having a cross-pin 34 stuck through it, a forked bell-crank lever 35 pivoted to the boss 27 and reaching with its forked arm under the cross-pin 34 for withdrawing the piston end $32^a$ out of the screw-thread 26 to allow the boss to be shifted to and fro at will upon the shaft 24 by an arm or handle 36, the whole as described and illustrated and for the purpose set forth.

3. In a machine for cutting bread, sausages and the like materials into small slices, the combination of a table 1 carrying a feed-slide 30 engaged by a rod 28 with a boss 27 of a screw-threaded shaft 24, a ratchet-wheel 25 keyed to the end of said shaft, an arm 22 held movably upon the shaft 24, a pawl $25^a$ fixed to the arm 22 engaging with the ratchet-wheel, a connecting-rod 21 connecting said arm 22 with a lever 19 oscillating on a pin 20, a crank-disk 11 upon a short shaft 12 carried in a bracket 13 upon the frame $2^b$, a heart-shaped groove 16 in the face of said crank-disk, a pin 17 in the upper arm 18 of lever 18, 19 engaging this lever with the crank-disk 11, a crank 14 at the outer end of shaft 12 for turning the crank-disk 11, the whole as described and illustrated and for the purpose set forth.

4. In a machine for cutting bread, sausages and like materials into slices in combination with a table 1 carrying a feed-slide 30 engaged by a rod 28 with a boss 27 on a screw-shaft 24, a ratchet-wheel 25 keyed to the end of said shaft, an arm 22 held movably upon the shaft, a pawl 25ª on the arm 22 engaging this arm with the ratchet-wheel, a rod 21 connecting said arm 22 to the double-armed lever 19, 18, a pin 17 fixed at the end of arm 18 and fitting into a heart-shaped groove 16 in the face of a crank-disk 11, a crank 14 and a shaft 12 carrying said crank-disk 11, a rod 8 pivoted to the bottom of the frame 2ᵇ of the machine by a pin 8ª, a slot 9 in said rod, a pin 10 at the side of the crank-disk reaching into the slot 9 of rod 8, a rod 7 pivoted at the opposite side of rod 8 to the bottom of frame 2 by a bolt 7ª, an obliquely-arranged knife 6 linked by its ends to the upper ends of the rods 7 and 8 respectively so as to be moved to and fro and up and down at the same time and thereby cutting through the material brought under it by the feed-slide 30, when the crank-disk is turned around by turning the crank 14, the whole as described and illustrated and for the purpose set forth.

In testimony whereof I have affixed my signature in presence of two witnesses.

FRIEDRICH GRAFF.

Witnesses:
 OTTO KÖNIG,
 J. A. RITTERSHAUS.